(12) United States Patent
Kuroi et al.

(10) Patent No.: US 10,119,588 B2
(45) Date of Patent: Nov. 6, 2018

(54) ROLLED COLLAR, ROLLED COLLAR MANUFACTURING APPARATUS, AND ROLLED COLLAR MANUFACTURING METHOD

(71) Applicant: Yorozu Corporation, Yokohama (JP)

(72) Inventors: Yutaka Kuroi, Yokohama (JP); Shingo Yokoyama, Yokohama (JP)

(73) Assignee: Yorozu Corporation, Yokohama (JP)

( * ) Notice: Subject to any disclaimer, the term of this patent is extended or adjusted under 35 U.S.C. 154(b) by 1 day.

(21) Appl. No.: 15/128,489

(22) PCT Filed: Mar. 25, 2014

(86) PCT No.: PCT/JP2014/058220
§ 371 (c)(1),
(2) Date: Sep. 23, 2016

(87) PCT Pub. No.: WO2015/145566
PCT Pub. Date: Oct. 1, 2015

(65) Prior Publication Data
US 2017/0138429 A1 May 18, 2017

(51) Int. Cl.
*F16F 1/38* (2006.01)
*B60G 21/05* (2006.01)
(Continued)

(52) U.S. Cl.
CPC ............ *F16F 1/3863* (2013.01); *B21D 53/10* (2013.01); *B21D 53/88* (2013.01); *B60G 7/001* (2013.01);
(Continued)

(58) Field of Classification Search
CPC . B60T 7/12; B60T 7/042; B60T 8/348; B60T 8/368; B60T 8/4081; B60T 13/686; B21D 39/037; B60G 21/0551
(Continued)

(56) References Cited

U.S. PATENT DOCUMENTS 1,213,684 A * 1/1917 Osterholm ............... F16C 17/10
138/145
2,177,584 A * 10/1939 Salansky ................. B21K 25/00
29/898.056
(Continued)

FOREIGN PATENT DOCUMENTS

CN 2177614 Y 9/1994
CN 2371383 Y 3/2000
(Continued)

OTHER PUBLICATIONS

International Search Report (English translation) for PCT/JP2014/058220 dated May 13, 2014.
(Continued)

*Primary Examiner* — Christopher P Schwartz
(74) *Attorney, Agent, or Firm* — Drinker Biddle & Reath LLP

(57) ABSTRACT

[Object] Damage to a surface of a resin bush caused by press-fitting is prevented even when a configuration for positioning during welding is added.
[Solving Means] A rolled collar (40) is a steel rolled collar into which a resin bush (90) is pressed-fitted, and which is joined to a joining member by welding. The rolled collar includes a main body part (50) formed in a hollow cylindrical shape, and a clinch part that joins both end surfaces of the main body part together by fitting. The rolled collar includes a notch part (70) formed by cutting off a portion of an annular edge (53) in the main body part. Here, a convex jig determining a position of the main body part at a time of welding is fit into the notch part. The rolled collar includes a cavity part (80) formed to be hollow from an inner circumferential surface side on a wall surface around the notch part to form a clearance (81) between the press-fitted (Continued)

resin bush and an edge portion (71) of the notch part on the inner circumferential surface side.

13 Claims, 9 Drawing Sheets

(51) Int. Cl.
    *B60G 7/00*           (2006.01)
    *B21D 53/10*        (2006.01)
    *B21D 53/88*        (2006.01)

(52) U.S. Cl.
    CPC .......... *B60G 21/052* (2013.01); *F16F 1/3842* (2013.01); *B60G 2200/21* (2013.01); *B60G 2202/1362* (2013.01); *B60G 2204/1434* (2013.01); *B60G 2204/41* (2013.01); *B60G 2204/44* (2013.01); *B60G 2204/4404* (2013.01); *B60G 2206/017* (2013.01); *B60G 2206/14* (2013.01); *B60G 2206/20* (2013.01); *B60G 2206/722* (2013.01); *B60G 2206/811* (2013.01); *B60G 2206/8102* (2013.01); *B60G 2206/8103* (2013.01); *B60G 2206/8201* (2013.01); *B60G 2206/82092* (2013.01); *B60G 2206/91* (2013.01); *B60G 2206/92* (2013.01); *B60G 2206/94* (2013.01)

(58) Field of Classification Search
    USPC .............. 267/276–283; 29/898.054, 898.056
    See application file for complete search history.

(56) References Cited

U.S. PATENT DOCUMENTS

| | | | | |
|---|---|---|---|---|
| 2,762,117 | A * | 9/1956 | Houck | B21D 39/037 16/2.1 |
| 2,855,252 | A * | 10/1958 | Budinger | B21D 39/037 138/156 |
| 4,638,538 | A * | 1/1987 | Kohama | B21D 22/08 29/898.054 |
| 6,082,721 | A * | 7/2000 | Kingsley | F16B 11/008 267/276 |
| 8,939,440 | B2 | 1/2015 | Namito | |
| 9,206,843 | B2 * | 12/2015 | Hauk | B21D 53/10 |
| 2011/0170814 | A1 * | 7/2011 | Nakamura | B60G 21/0551 384/125 |
| 2011/0252595 | A1 | 10/2011 | Nagahori et al. | |
| 2013/0270787 | A1 * | 10/2013 | Suwa | B60G 21/0551 280/124.107 |

FOREIGN PATENT DOCUMENTS

| | | |
|---|---|---|
| JP | S60145639 U | 9/1985 |
| JP | H01320332 A | 12/1989 |
| JP | H09315124 A | 12/1997 |
| JP | 2005299898 A | 10/2005 |
| JP | 2007069820 A | 3/2007 |
| WO | WO-2006092420 A1 | 9/2006 |
| WO | WO-2008074708 A1 | 6/2008 |
| WO | WO-2010110399 A1 | 9/2010 |
| WO | WO-2014/147728 A1 | 9/2014 |

OTHER PUBLICATIONS

International Search Report (Japanese) with Written Opinion of International Searching Authority for PCT/JP2014/058220 dated May 13, 2014.

International Preliminary Report on Patentability for International Application No. PCT/JP2014/058220, dated Sep. 27, 2016.

Supplementary European Search Report for Application No. EP 14 88 6948, dated Mar. 10, 2017.

Chinese Office Action with English Translation for Chinese Application No. 201480077465.5, dated Jan. 19, 2018.

Korean Office Action with English Translation of Korean Office Action for Korean Application No. 10-2016-7025683, dated Apr. 27, 2018.

\* cited by examiner (A)

(B)

(A)

(B)

(A)

(B)

ROLLED COLLAR, ROLLED COLLAR MANUFACTURING APPARATUS, AND ROLLED COLLAR MANUFACTURING METHOD

CROSS-REFERENCE TO RELATED APPLICATIONS

This application is a national stage application (under 35 U.S.C. § 371) of PCT/JP2014/058220, filed Mar. 25, 2014, which is incorporated herein by reference in its entirety.

TECHNICAL FIELD

The present invention relates to a rolled collar formed by rolling a plate material, an apparatus for manufacturing the rolled collar, and a method of manufacturing the rolled collar.

BACKGROUND ART

A link member which is attached such that the link member can freely rotate or rock is widely used to support a member or deliver a load. For example, in a vehicle, the link member is incorporated into a vehicle suspension mechanism. The vehicle suspension mechanism includes an arm member such as a trailing arm, and a suspension arm, and a collar member having a hollow cylindrical shape which pivotally supports the arm member in a vehicle body is joined to the arm member. A bush is press-fitted into the collar member, arid a hollow shaft inserted, into the bush is connected to a bracket and the like from a vehicle body side. Examples of the collar member include a rolled collar formed in a cylindrical shape by rolling a strip-shaped plate material (for example, see Patent Literature 1).

CITATION LIST

Patent Literatures

Patent Literature 1: Japanese Unexamined Utility Model Application Publication No. 1985-145639

SUMMARY OF INVENTION

Technical Problem

A resin bush is used to lighten a bush which is press-fitted into a steel rolled collar. When the resin bush is press-fitted into the steel rolled collar, an excessive scratch needs to be prevented from being generated on a surface of the bush to avoid causing a decrease in strength of the bush.

In addition, at the time of welding, it is important to determine a position of the rolled collar, and it is required to add a configuration for determining the position of the rolled collar to the rolled collar. Further, even when the configuration for determining the position of the rolled collar is added, it is required to prevent a scratch caused by press-fitting from being generated on a surface of the resin bush.

The invention has been conceived in response to the above requirements, and an object of the invention is to provide a rolled collar capable of preventing a scratch caused by press-fitting from being generated on a surface of a resin bush even when a configuration for positioning is added at the time of welding. Further, an object of the invention is to provide an apparatus for manufacturing the rolled collar capable of preferably manufacturing the rolled collar, and a method of manufacturing the rolled collar.

Means for Solving Problem

A rolled collar of the invention which achieves the above objects is a rolled collar made of steel into which a resin bush is press-fitted, and which is fit to a joining member by welding. The rolled collar includes
a main body part formed in a hollow cylindrical shape by bending and forming a steel plate material having a rectangular shape, and matching both end surfaces with each other,
a clinch part provided on each of the both end surfaces in the main body part to join the both end surfaces by fitting,
a notch part formed by cutting off a portion of an annular edge in the main body part, a convex jig determining a position of the main body part at a time of welding being fit into the notch part, and
a cavity part formed to be hollow from an inner circumferential surface side on a wall surface around the notch part to form a clearance between the press-fitted resin bush and an edge portion of the notch part on the inner circumferential surface side.

A rolled collar manufacturing apparatus of the invention which achieves the above objects is an apparatus for manufacturing a rolled collar using a progressive press-working apparatus including a plurality of pressing units for successively forming a long steel processed material by sending the processed material in order. The rolled collar manufacturing apparatus includes
a trim unit for trimming the processed material in contour shapes of the main body part and the clinch part while leaving a connecting part for sending the processed material in order,
a coining unit for forming a coining recess by coining a portion of the processed material in a flat plate state before bending and forming the trimmed processed material, and
a cutting unit for forming the notch part and the cavity part by cutting off a portion of the coining recess.

A rolled collar manufacturing method of the invention which achieves the above objects is a method of manufacturing a rolled collar using a progressive press-working method including a plurality of pressing processes in which a long steel processed material is successively formed by being sent in order. The rolled collar manufacturing method includes
trimming the processed material in contour shapes of the main body part and the clinch part while leaving a connecting part for sending the processed material in order,
forming a coining recess by coining a portion of the processed material in a flat plate state before bending and forming the trimmed processed material, and
forming the notch part and the cavity part by cutting off a portion of the coining recess.

Advantageous Effect of the Invention

According to a rolled collar of the invention, a notch part into which a convex jig that determines a position of a main body part at the time of welding is fitted, and a cavity part that forms a clearance between a press-fitted resin bush and an edge portion of the notch part on an inner circumferential surface side are provided in the main body part having a hollow cylindrical shape. According to this configuration, even when the notch part which is a configuration for positioning at the time of welding is added, a scratch caused by press-fitting may be sufficiently prevented from being generated on a surface of the resin bush.

A rolled collar manufacturing apparatus of the invention is an apparatus for manufacturing a rolled collar using a progressive press-working apparatus including a plurality of pressing units for successively forming a long steel processed material by sending the processed material in order, and includes a trim unit, a coining unit, and a cutting unit. The rolled collar which includes a notch part and a cavity part may be efficiently manufactured through progressive formation.

A rolled collar manufacturing method of the invention is a method of manufacturing a rolled collar using a progressive press-working method including a plurality of pressing processes in which a long steel processed material is successively formed by being sent in order. The rolled collar may be efficiently manufactured using progressive formation through trimming, formation of a coining recess, and formation of a notch part and a cavity part.

DESCRIPTION OF EMBODIMENTS

Figure 1:
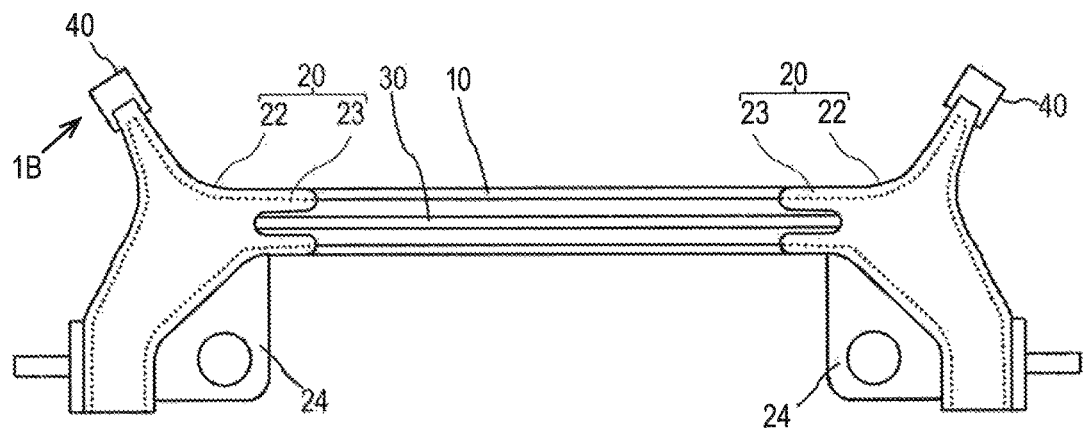
FIG. 1(A) is a bottom view illustrating a torsion beam type suspension in which a rolled collar is used as a collar member.
FIG. 1(B) is an arrow view seen from an arrow 1B of FIG. 1(A).
Figure 1:
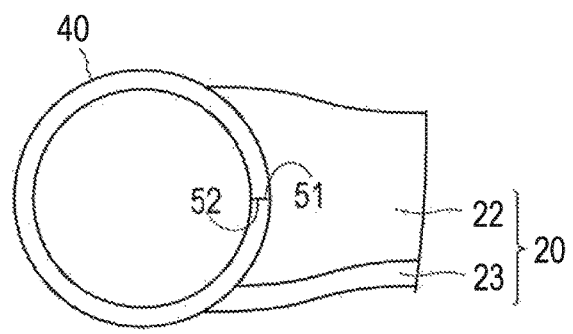

Hereinafter, an embodiment of the invention will be described with reference to accompanying drawings. The same reference numeral will be applied to the same component in description of the drawings, and a repeated description will be omitted. Scales of the drawings are exaggerated for convenience of description, and are different from actual scales.

FIG. 1(A) is a bottom view illustrating a torsion beam type suspension 100 in which a rolled collar 40 is used as a collar member, and FIG. 1(B) is an arrow view seen from an arrow 1B of FIG. 1(A).

The torsion beam type suspension 100 illustrated in FIGS. 1(A) and 1(B) is a vehicle suspension mechanism disposed on a rear side of a vehicle. The torsion beam type suspension 100 includes a torsion beam 10 disposed to extend in a left-right direction of the vehicle, a trailing arm 20 serving as an arm member joined to both end portions of the torsion beam 10, and a roll bar 30 disposed inside the torsion beam 10 to adjust roll stiffness.

The torsion beam 10 is a U-shaped beam, and is disposed such that a U-shaped opening portion is directed downward at the time of loading the vehicle.

The trailing arm 20 includes an upper member 22 having a depression and a flat plate-shaped lower member 23. The upper member 22 has a spring seat 24 that receives a spring which absorbs an impact of a tire. The lower member 23 is disposed to block the depression of the upper member 22, and prevents deformation of the upper member 22. The rolled collar 40 which has a hollow cylindrical shape and pivotally supports the trailing arm 20 in the vehicle body is welded and joined to the trailing arm 20.

Figure 2:
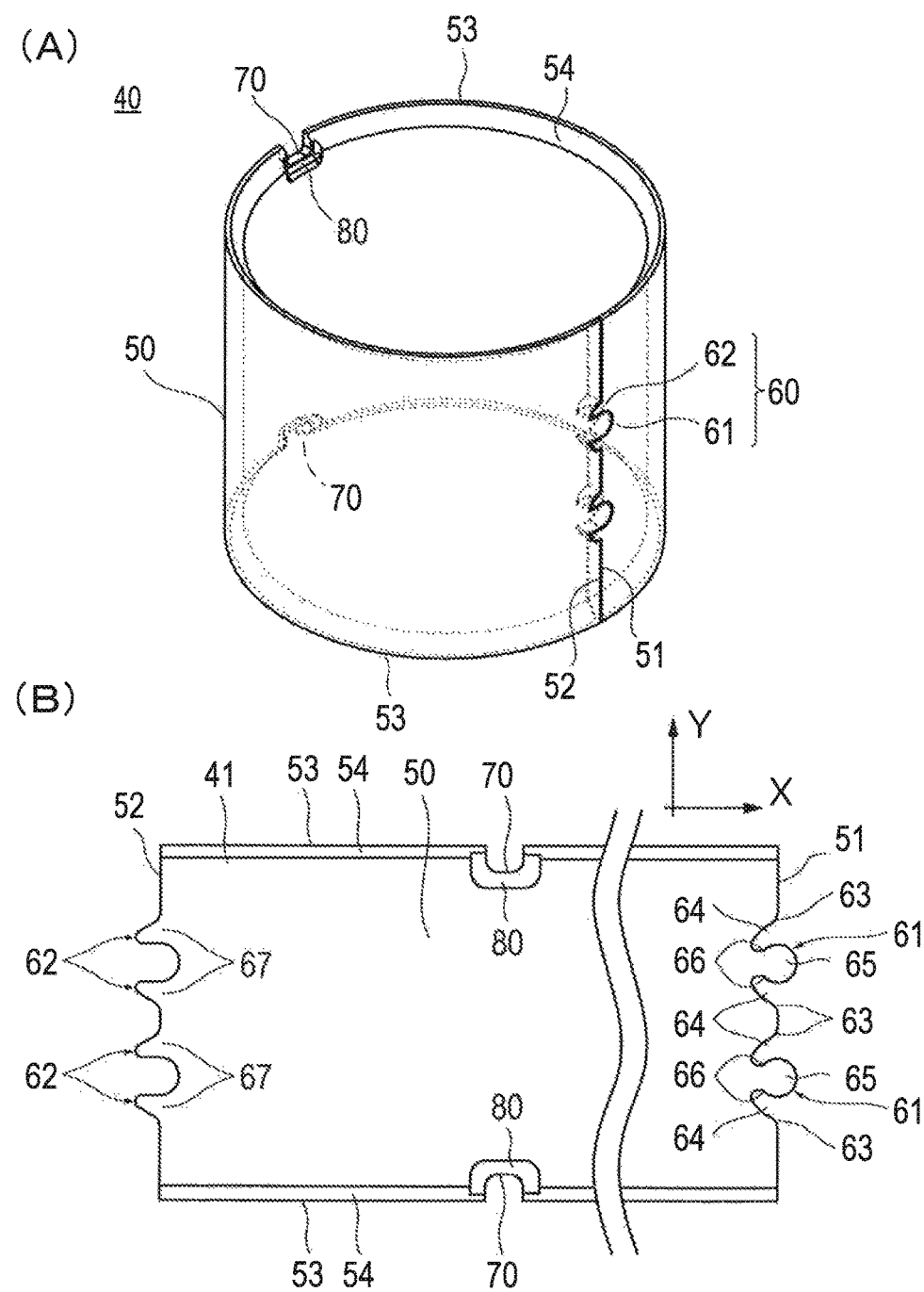
FIG. 2(A) is a perspective view illustrating the rolled collar.
FIG. 2(B) is a developed front view illustrating a plate material.
Figure 3:
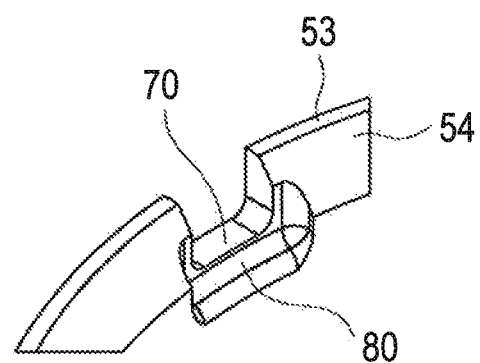
FIGS. 3(A) and 3(B) are an enlarged perspective view and an enlarged cross-sectional view illustrating a notch part and a cavity part of the rolled collar.
Figure 3:
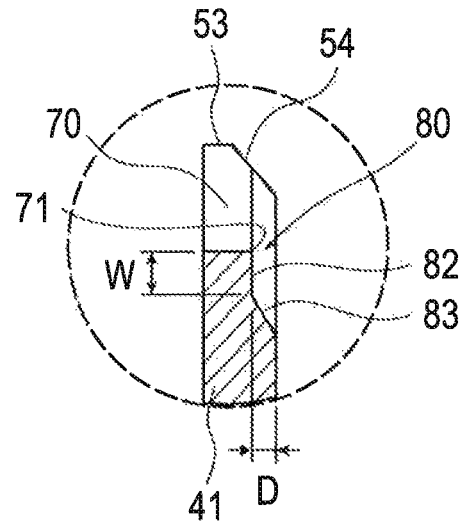
Figure 4:
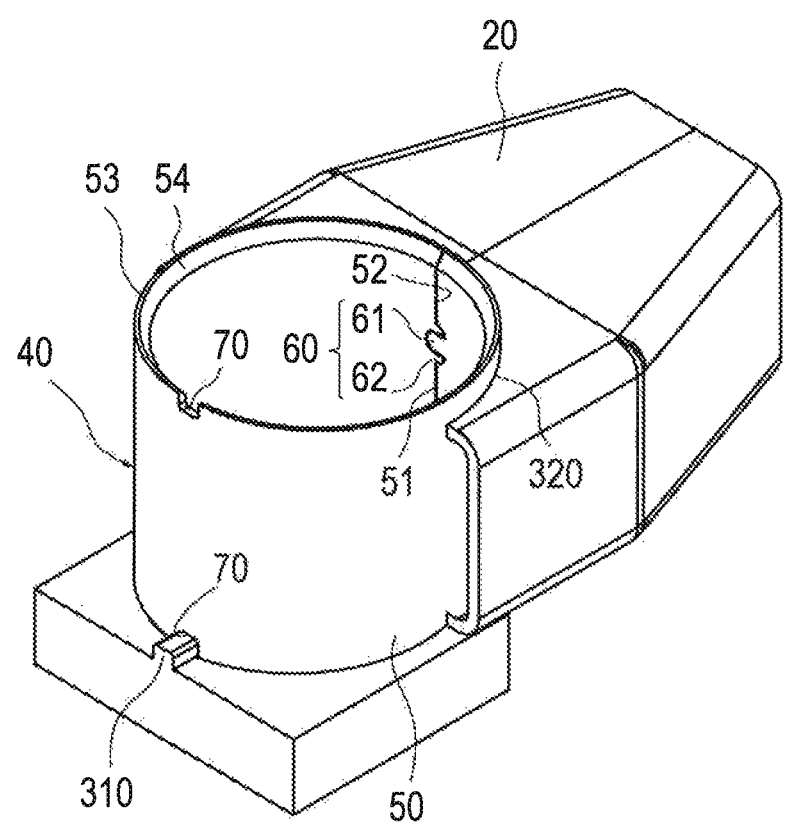
FIG. 4 is a perspective view illustrating a state in which a position of the rolled collar is determined by a convex jig at the time of welding.
Figure 5:
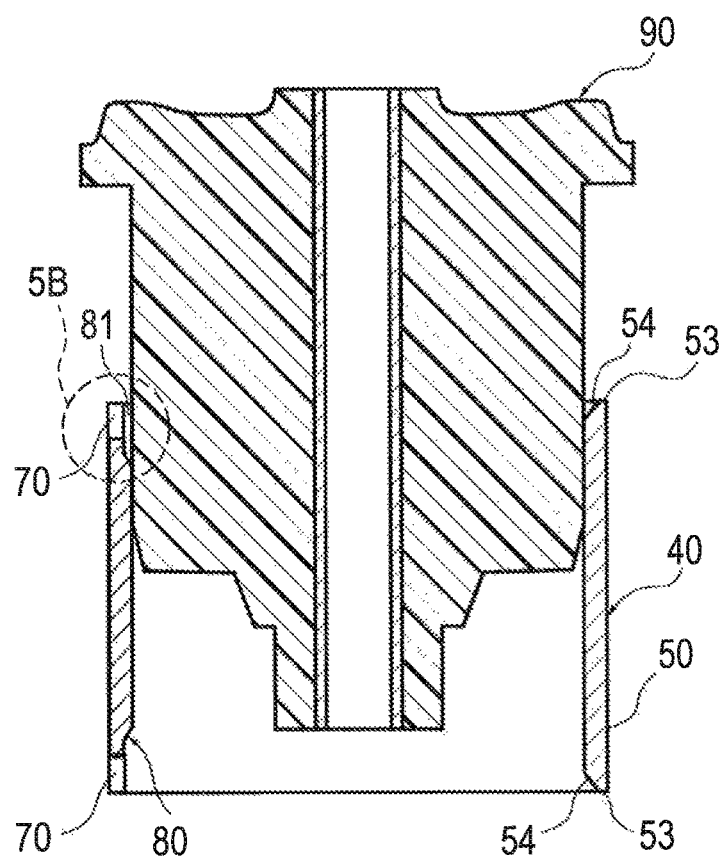
FIG. 5(A) is a cross-sectional view illustrating a state in which a resin bush is press-fitted into the steel rolled collar.
FIG. 5(B) is an enlarged cross-sectional view illustrating a portion 5B of FIG. 5(A).
Figure 5:
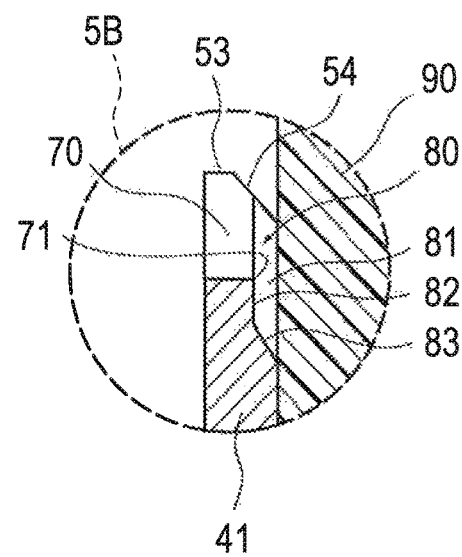
Figure 6:
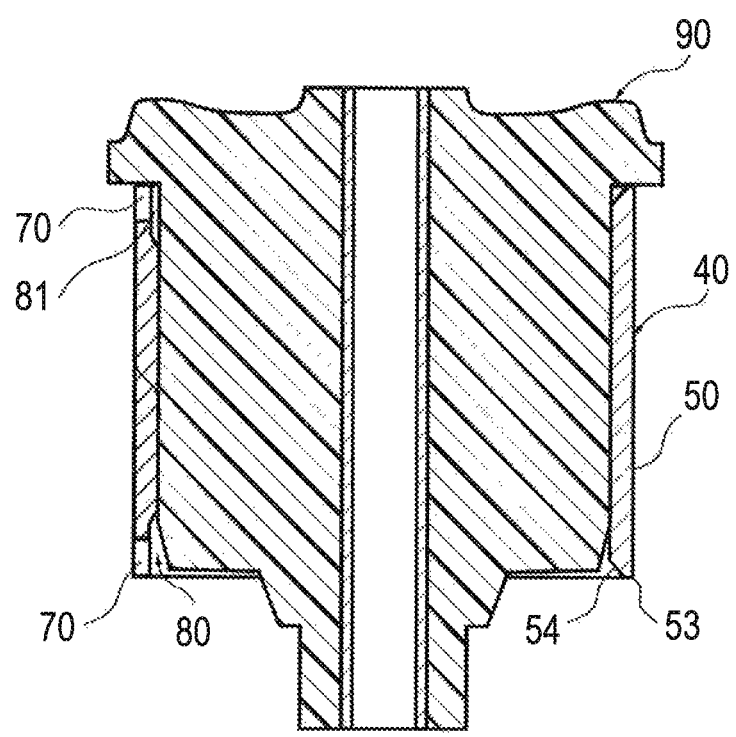
FIG. 6 is a cross-sectional view illustrating a state in which press-fitting of the resin bush into the steel rolled collar is completed.

FIG. 2(A) is a perspective view illustrating the rolled collar 40, and FIG. 2(B) is a developed front view illustrating a plate material 41. Referring to FIG. 2(B), an X-axis represents a longitudinal direction of the plate material 41, and a Y-axis represents a direction along first and second butting end surfaces 51 and 52. FIGS. 3(A) and 3(B) are an enlarged perspective view and an enlarged cross-sectional view illustrating a notch part 70 and a cavity part 80 of the rolled collar 40. and FIG. 4 is a perspective view illustrating a state in which a position of the rolled collar 40 is determined by a convex jig 310 at the time of welding. FIG. 5(A) is a cross-sectional view illustrating a state in which a resin bush 90 is press-fitted into the steel rolled collar 40, and FIG. 5(B) is an enlarged cross-sectional view illustrating a portion 5B of FIG. 5(A). FIG. 6 is a cross-sectional view illustrating a state in which press-fitting of the resin bush 90 into the steel rolled collar 40 is completed.

Referring to FIGS. 2(A) and 2(B) and FIGS. 3(A) and 3(B), the rolled collar 40 is formed by bending and forming the plate material 41 which is made of steel and has a rectangular shape, and is joined to the trailing arm 20 by welding. The resin bush 90 is press-fitted into the rolled collar 40. In summary, the rolled collar 40 includes a main body part 50 formed in a hollow cylindrical shape by bending and forming the steel plate material 41 having the rectangular shape, and butting the end surfaces 51 and 52 with each other, and a clinch part 60 provided on each of the both end surfaces 51 and 52 of the main body part 50 to join the both end surfaces 51 and 52 by fitting. The rolled collar 40 further includes the notch part 70 which is formed by cutting off a portion of an annular edge 53 of the main body part 50 and into which the convex jig 310 that determines a position of the main body part 50 is fit at the time of welding, and the cavity part 80 formed to be hollow from an inner circumferential surface on a wall surface around the notch part 70 to form a clearance 81 between the press-fitted resin bush 90 and the edge portion 71 of the notch part 70 on the inner circumferential surface side. Hereinafter, details will be described.

In the present embodiment, the rolled collar 40 is used as a collar member that pivotally supports the trailing arm 20 of the vehicle suspension mechanism (corresponding to a joining member and an arm member) in the vehicle body. Within a range of the above-described purpose of use, a size and a wall thickness of the main body part 50, the number of clinch parts 60, and a shape and a size of the clinch part 60 are appropriately selected.

The main body part 50 has a first butting end surface 51 provided on one end portion side of the plate material 41, and a second butting end surface 52 provided on the other end portion side of the plate material 41 and butted with the first butting end surface 51 by bending and forming the plate material 41.

The clinch part 60 has a first clinch part 61 provided at the first butting end surface 51, and a second clinch part 62 provided at the second butting end surface 52 and fit to the first clinch part 61.

The first clinch part 51 has hollows 64 at which insertion openings 63 are opened to the first butting end surface 51, a head portion 65 protruding outward beyond the first, butting end surface 51, and locking portions 66 provided at base portions of the head portion 65 inside the hollows 64 to lock the second clinch part 62. The second clinch part 62 has convex pieces 67 which protrude outward beyond the second butting end surface 52 and are fit into the hollows 64 of the first clinch part 61. A pair of first clinch parts 61 is provided in a direction along the first butting end surface 51, and a pair of second clinch parts 62 is provided in a direction along the second butting end surface 52.

When the first and second butting end surfaces 51 and 52 are butted with each other in a circumferential direction, the convex pieces 67 of the second clinch part 62 are inserted into the hollows 64 from the insertion openings 63. The convex pieces 67 of the second clinch part 62 are subjected to plastic deformation to interpose the base portions of the head portion 65. A function of preventing falling out is sufficiently exhibited when the convex pieces 67 are locked in the locking portions 66 inside the hollows 64, in this way, the first and second butting end surfaces 51 and 52 are joined to each other by fitting the first clinch part 61 to the second clinch part 62.

As illustrated in FIGS. 3(A) and 3(B), the notch part 70 is formed by cutting off a portion of the annular edge 53 of the main body part 50. As illustrated in FIG. 4, when the convex jig 310 that determines a position of the main body part 50 at the time of welding is fit into the notch part 70, a position of the rolled collar 40 with respect to the trailing arm 20 is determined.

The notch part 70 is formed at a position for including the butted, both end surfaces 51 and 52 in a welding place when the convex jig 310 is fit into the notch part 70. When the notch part 70 is fit to the convex jig 310 to determine a position of the main body part 50, the trailing arm 20 faces the main body part 50 while straddling the butted both end surfaces 51 and 52.

The notch part 70 is provided at each of two annular edges 53 in the main body part 50. When the rolled collar 40 is set in a welding jig, a vertical direction of the main body part 50 may not be noticed. Therefore, it is possible to easily perform an operation of setting the rolled collar 40 at the time of welding.

The annular edge 53 has a guide surface 54 that guides the press-fitted bush 90. The guide surface 54 is inclined from an end portion of the annular edge 53 toward a hole portion of the main body part 50. The resin bush 90 is easily press-fitted while being guided by the guide surface 54.

The cavity part 80 is formed to be hollow from the inner circumferential surface side on the wall surface around the notch part 70. As illustrated in FIGS. 5(A) and 5(B), the clearance 81 is formed between the press-fitted resin bush 90 and the edge portion 71 of the notch part 70 on the inner circumferential surface side. According to this configuration, it is possible to sufficiently prevent a scratch caused by press-fitting from being generated on a surface of the resin bush 90 even when the notch part 70, which is a configuration for positioning at the time of welding, is added.

Referring to FIG. 3(B) and FIG. 5(B), the cavity part 80 is formed by squashing a portion of the plate material 41 by pressing. The cavity part 80 has a crushing part 82 which is continued from the notch part 70 and has a smaller thickness than a plate thickness of the plate material 41, and a chamfer part 83 which is continued from the crushing part 82 and increases in thickness up to the plate thickness of the plate material 41. The clearance 81 is reliably formed between the press-fitted resin bush 90 and the edge portion 71 of the notch part 70 on the inner circumferential surface side by the crushing part 82. The resin bush 90 is easily press-fitted while being guided by the chamfer part 83, and it is possible to further prevent a scratch caused by press-fitting from being generated on a surface of the resin bush 90.

A size of the cavity part 80 is appropriately set. For example, a depth D from the inner circumferential surface to the crushing part 82 is 20%±0.1 mm of the plate thickness t of the plate material 41, and a width W of the crushing part 82 from the notch part 70 is in a range of 1.0 to 2.0 mm. When the plate thickness t is 2.9 mm, for example, the depth D from the inner circumferential surface to the crushing part 82 is 0.5 mm. An experiment confirms that a scratch caused by press-fitting may be prevented from being generated on a surface of the resin bush 90 according to the cavity part 80, the dimensions of which are set as described above. The above-described dimensional data is merely an example, and does not restrict the invention.

When a rolled collar is formed from a plate material having a relatively thin wall, first and second butting end surfaces of the plate material may be overlapped in a direction along the end surfaces (radial direction of a hollow cylindrical member) through roll forming. However, in the rolled collar 40 that requires strong rigidity, there is difficulty in using roll forming since the relatively thick plate material 41 is used. In this case, the first and second butting end surfaces 51 and 52 are butted with each other in the circumferential direction through press forming, When the first and second butting end surfaces 51 and 52 are butted with each other in the circumferential direction, the convex pieces 67 are inserted, into the hollows 64 from the insertion openings 63. Since the plate material 41 is bent in the circumferential direction through press forming, a linear portion does not remain not only in the main body part 50, but also in the convex pieces 67. As a result, roundness of the rolled collar 40 may be increased.

Next, an outline of an apparatus 200 for manufacturing the rolled collar 40 will be described with reference to FIGS. 7 to 11.

Figure 7:
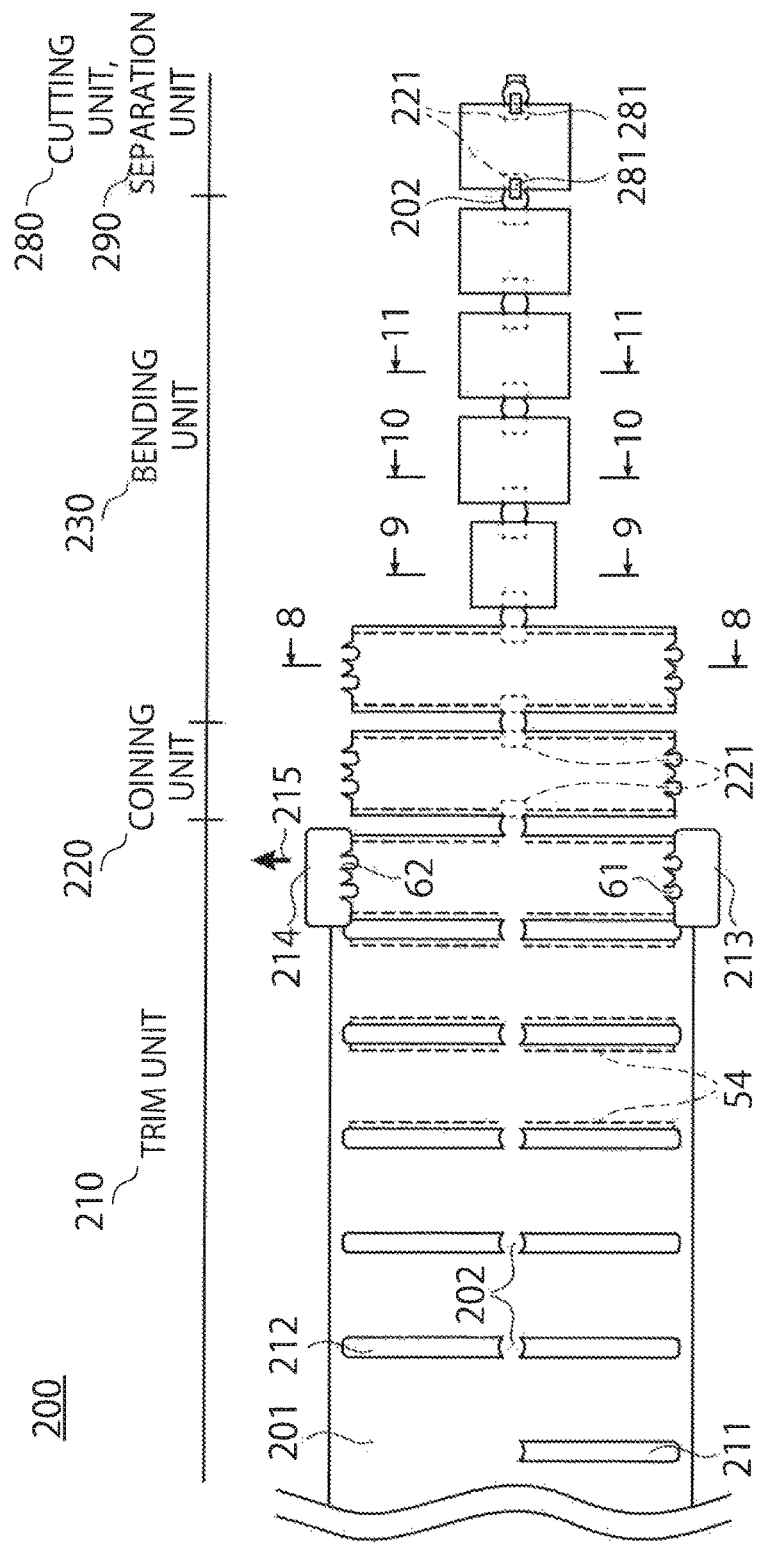
FIG. 7 is a plan view illustrating a processed material which is sent in order in an apparatus for manufacturing the rolled collar.

FIG. 7 is a plan view illustrating a processed material 202 which is sent in order in the apparatus 200 for manufacturing the rolled collar 40, and FIGS. 8 to 11 are cross-sectional views taken along 8-8 line, 9-9 line, 10-10 line, and 11-11 line of FIG. 7, respectively.

The apparatus 200 for manufacturing the rolled collar 40 manufactures the above-described rolled collar 40 using a progressive press-working apparatus that includes a plurality of pressing units for successively forming the long steel processed material 201 by sending the processed material 201 in order.

An outline of the apparatus 200 for manufacturing the rolled collar 40 will be described with reference to FIG. 7. The apparatus 200 includes a trim unit 210, a coining unit 220, a bending unit 230, a cutting unit 280, and a separation unit 290. Each of the units includes one or a plurality of pressing units.

The trim unit 210 trims the processed material 201 in contour shapes of the main body part 50 and the clinch part 60 while leaving a connecting part 202 for sending the processed material 201 in order. The connecting part 202 is provided at a center location of the processed material 201 in a width direction. The trim unit 210 includes a plurality of pressing units. The trim unit 210 includes a pressing unit that forms a long hole 211 extending to one side (lower side in the figure) in the width direction from the connecting part 202, a pressing unit that forms a long hole 212 extending to the other side (upper side in the figure) in the width direction from the connecting part 202, and a pressing unit that forms the guide surface 54 in a part becoming the annular edge 53. The trim unit 210 further includes a pressing unit 213 that forms the first clinch part 61 in a part becoming the first butting end surface 51, and a pressing unit 214 that forms the second clinch part 62 in a part becoming the second butting end surface 52. A scrap removed from the processed material 201 is discharged from the pressing unit as indicated by an arrow 215.

The coining unit 220 forms a coining recess 221 by coining a portion of the processed material 201 in a flat plate state before bending and forming the trimmed processed material 201. The coining recess 221 is a part that becomes the notch part 70 and the cavity part 80 when a portion of the coining recess 221 is cut off, The coining unit 220 includes a pressing unit that forms the coining recess 221. The pressing unit of the coining unit 220 includes an upper die that presses down the processed material 201, and a lower die having a convex portion that forms the coining recess 221. The lower die is pushed up, and the coining recess 221 is formed on the processed material 201 by the convex portion.

In an illustrated embodiment, the coining unit 220 forms the coining recess 221 in a part continued from the connecting part 202.

The bending unit 230 forms the main body part 50 by bending and forming the processed material 201 on which the coining recess 221 is formed, and joining the both end surfaces 51 and 52 of the processed material 201 to each other through fitting of the clinch part 60. The bending unit 230 l includes a plurality of pressing units. The bending unit 230 includes a pressing unit 240 (see FIG. 8) that performs preforming in which both ends on sides of the first and second butting end surfaces 51 and 52 are slightly bent, a first pressing unit 250 (see FIG. 9) that performs a first folding step in which the processed material 201 is folded in a U-shaped cross section, a second pressing unit 260 (see FIG. 10) that performs a second folding step such that a shape of the processed material 201 approximates to a circular arc, and a third pressing unit 270 (see FIG. 11) that performs a third folding step in which the processed material 201 is finished in a circular cross section.

Figure 8:
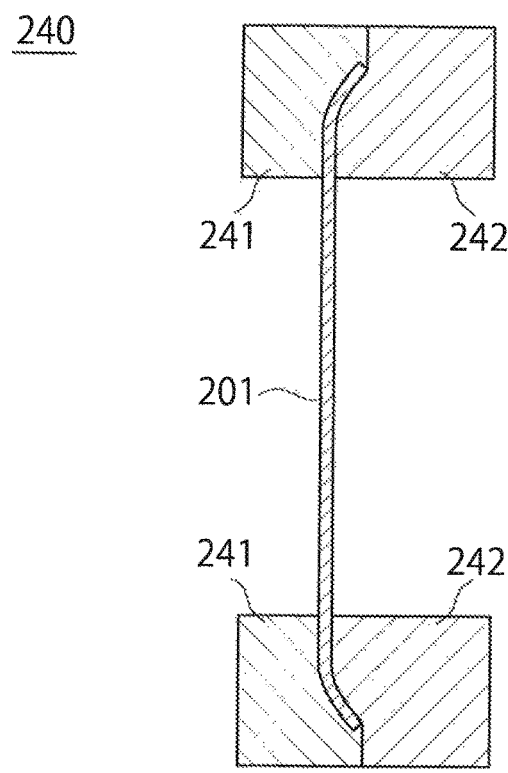
FIG. 8 is a cross-sectional view taken along 8-8 line of FIG. 7.

As illustrated in FIG. 8, the pressing unit 240 includes an upper die 241 and a lower die 242. Preforming in which the both ends on the sides of the first and second butting end surfaces 51 and 52 are slightly bent is performed by the upper and lower dies 241 and 242.

Figure 9:
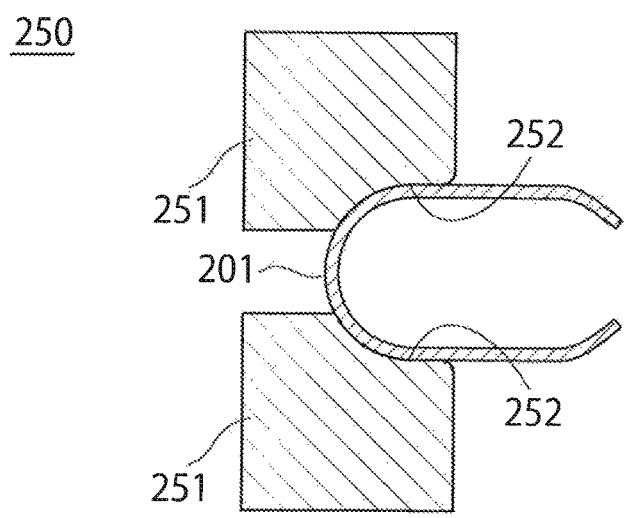
FIG. 9 is a cross-sectional view taken along 9-9 line of FIG. 7.

As illustrated in FIG. 9, the first pressing unit 250 includes an upper die 251. A horseshoe-shaped depression 252 is provided in the upper die 251. The processed material 201 preformed in a previous process is folded in a U-shaped cross section using the depression 252.

Figure 10:
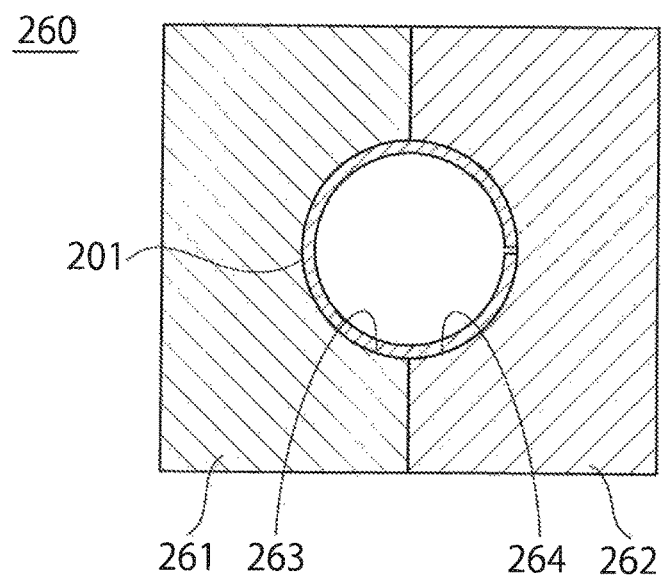
FIG. 10 is a cross-sectional view taken along 10-10 line of FIG. 7.

As illustrated in FIG. 10, the second pressing unit 260 includes an upper die 261 and a lower die 262. A semi-circular depression 263 is provided in the upper die 261, and a depression 264 that forms a substantially circular shape with the depression 263 of the upper die 261 is provided in the lower die 262. The second folding step is performed such that a shape of the processed material 201, which is subjected to the first folding step in a previous process, approximates to a circular arc by both the depressions 263 and 264.

Figure 11:
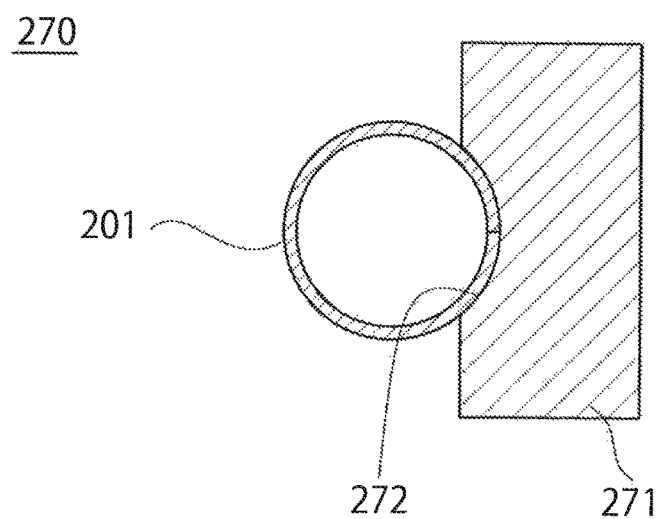
FIG. 11 is a cross-sectional view taken along 11-11 line of FIG. 7.

As illustrated in FIG. 11, the third pressing unit 270 includes a lower die 271. A semi-circular depression 272 is provided in the lower die 271. The lower die 271 is pushed up by a slight dimension, and the third folding step is performed such that the processed material 201, which is subjected to the second folding step in a previous process, is finished in a circular cross section by the depression 272.

Referring to FIG. 7 again, the cutting unit 280 forms the notch part 70 and the cavity part 80 by cutting off a portion of the coining recess 221. The cutting unit 280 includes a pressing unit 281 that cuts off the portion of the coining recess 221. The pressing unit 281 of the cutting unit 280 includes an upper die for cutting a part corresponding to the notch part 70.

The separation unit 290 forms the notch part 70 and the cavity part 80 in the bent and formed main body part 50, and then separates the main body part 50 from the processed material 201. As described in the foregoing, in the illustrated embodiment, the coining recess 221 is formed in a part continued from the connecting part 202. When a part corresponding to the notch part 70 is cut in the cutting unit 280, the connecting part 202 is cut away from the main body part 50. Therefore, in the illustrated embodiment, the cutting unit 280 functions as the separation unit 290.

Next, an outline of procedures for manufacturing the rolled collar 40 will be described.

The above-described rolled collar 40 is manufactured using a progressive pressing method that includes a plurality of pressing processes in which the long steel processed material 201 is sent in order and successively formed.

In the trim unit 210 of the apparatus 200 for manufacturing the rolled collar 40, the processed material 201 is trimmed in contour shapes of the main body part 50 and the clinch part 60 while keeping the connecting part 202 for sending the processed material 201 in order remained.

Subsequently, in the coining unit 220, a portion of the processed material 201 in a flat plate state is coined to form the coining recess 221 before the trimmed processed material 201 is bent and formed.

Subsequently, in the bending unit 230, the processed material 201 in which the coining recess 221 is formed in bent and formed, and the both end surfaces 51 and 52 of the processed material 201 are joined to each other through fitting of the clinch part 60, thereby forming the main body part 50.

Subsequently, in the cutting unit 280, the notch part 70 and the cavity part 30 are formed by cutting off a portion of the coining recess 221. In the illustrated embodiment, the cutting unit 280 functions as the separation unit 290. That is, in the cutting unit 280, the notch part 70 and the cavity part 80 are formed in the bent and formed main body part 50, and then the main body part 50 is separated from the processed material 201. The rolled collar 40 is manufactured through the above-described series of procedures.

Next, an outline of operation of a case in which the rolled collar 40 is welded to the trailing arm 20 will be described.

As illustrated in FIG. 4, the trailing arm 20 and the rolled collar 40 are set in the welding jig at the time of welding. In this instance, the rolled collar 40 is set such that the convex jig 310 is fit into the notch part 70 of the main body part 50. The notch part 70 is provided at each of the two annular edges 53 in the main body part 50. When the rolled collar 40 is set in the welding jig, the vertical direction of the main body part 50 may not be noticed. Therefore, it is possible to easily perform an operation of setting the rolled collar 40 at the time of welding. When the convex jig 310 is fit into the notch part 70, a position of the rolled collar 40 with respect to the trailing arm 20 is determined.

The notch part 70 is formed at a position for including the butted both end surfaces 51 and 52 in a welding place when the convex jig 310 is fit into the notch part 70. When the notch part 70 is fit to the convex jig 310 to determine a position of the main body part 50, and welding is performed in this state, the main body part 50 is welded and joined to the trailing arm 20 across the butted both end surfaces 51 and 52. A portion to which reference numeral 320 is applied in FIG. 4 is the welding place.

When the rolled collar 40 can be set at a position at which welding and joining may be performed across the butted both, end surfaces 51 and 52 by fitting the notch part 70 to the convex jig 310, a position at which the notch part 70 is formed and a position, at which the convex jig 310 is provided are not particularly restricted. For example, in addition to a case in which the notch part 70 is formed on the opposite side from the both end surfaces 51 and 52 as in the illustrated example, in a case in which the notch part 70 is formed close by the both end surfaces 1 and 52 or a case in which the notch part 70 is formed at the both end surfaces 51 and 52, when a position at which the convex jig 310 is provided is adjusted, the rolled collar 40 can be set at the position at which welding and joining may be performed across the both end surfaces 51 and 52.

The batted both end surfaces 51 and 52 of the rolled collar 40 may be prevented from being opened due to load acting on the main body part 50 since a joined end surface of the trailing arm 20 is welded and joined to the rolled collar 40 across the both end surfaces 51 and 52 of the rolled collar 40. Bonding strength of fitting between the first and second clinch parts 61 and 62 is applied, and thus joining of the both end surfaces 51 and 52 of the rolled collar 40 may be maintained. Since the rolled collar 40 is used, cost may be reduced when compared to a case in which a collar member is formed from a pipe material, and thus it is possible to contribute to a reduction in cost of the torsion beam type suspension 100.

A welded and joined length is about one third of the rolled collar 40 in a circumferential direction. The rolled, collar 40 and the trailing arm 20 are arc-welded using an automatic welding machine, and the like along an outer circumference of a surface in contact with the rolled collar 40.

Next, an outline of operation of a case in which the resin bush 90 is press-fitted into the rolled collar 40 will be described.

As illustrated in FIGS. 5(A) and 5(B) and FIG. 6, when the bush 90 is press-fitted into the rolled collar 40, the bush 90 is press-fitted while being guided by the guide surface 54 of the annular edge 53. The guide surface 54 evenly reduces a diameter of the resin bush 90 over a whole circumference due to press-fitting of the bush 30, and thus the resin bush 90 may be easily press-fitted.

The clearance 81 is formed by the cavity part 80 between the press-fitted resin bush 90 and the edge portion 71 of the notch part 70 on the inner circumferential surface side. The clearance 81 is reliably formed by the crushing part 82 of the cavity part 80. The edge portion 71 of the notch part 70 is not pressed against a surface of the bush 90, and thus a scratch caused by press-fitting is sufficiently prevented from being generated on the surface of the bush 90.

The bush 90 is easily press-fitted while being guided by the chamfer part 83 of the cavity part 80, and thus the scratch caused by press-fitting may be further prevented from being generated on the surface of the bush 90.

As described in the foregoing, the rolled collar 40 of the present embodiment includes the notch part 70 into which the convex jig 310 that determines a position of the main body part 50 at the time of welding is fitted, and the cavity part 80 that forms the clearance 81 between the press-fitted resin bush 90 and the edge portion 71 of the notch part 70 on the inner circumferential surface side in the main body part 50 having the hollow cylindrical shape. According to this configuration, even when the notch part 70 corresponding to a configuration for positioning at the time of welding is added, a scratch caused by press-fitting may be sufficiently prevented from being generated on a surface of the resin bush 90.

The cavity part 80 has the crushing part 82 and the chamfer part 83, and the clearance 81 is reliably formed by the crushing part 82 between the press-fitted resin bush 90 and the edge portion 71 of the notch part 70 on the inner circumferential surface side. In addition, the resin bush 90 is easily press-fitted while being guided by the chamfer part 83, and the scratch caused by press-fitting may be further prevented from being generated on the surface of the resin bush 90.

An experiment confirms that a scratch caused by press-fitting may be sufficiently prevented from being generated on a surface of the resin bush 90 when the depth D from the inner circumferential surface to the crushing part 82 is 20%±0.1 mm of the plate thickness of the plate material 41, and the width W of the crushing part 82 from the notch part 70 is in the range of 1.0 to 2.0 mm.

When the convex jig 310 is fit into the notch part 70, the notch part 70 is formed at a position for including the butted both end surfaces 51 and 52 in the welding place. When the notch part 70 is fit to the convex jig 310 to determine a position of the main body part 50, and welding is performed in this state, the main body part 50 is welded and joined to the trailing arm 20 across the butted both end surfaces 51 and 52. The butted both end surfaces 51 and 52 of the rolled collar 40 may be prevented from being opened due to load acting on the main body part 50. Bonding strength of fitting between the first and second clinch parts 61 and 62 is applied, and thus joining of the both end surfaces 51 and 52 of the rolled collar 40 may be maintained.

The notch part 70 is provided at each of the two annular edges 53 in the main body part 50. When the rolled collar 40 is set in the welding jig, the vertical direction of the main body part 50 may not be noticed, and it is possible to easily perform an operation of setting the rolled collar 40 at the time of welding.

The guide surface 54 that guides the press-fitted bush 90 is provided at the annular edge 53, and thus the resin bush 90 is easily press-fitted while being guided by the guide surface 54., The rolled collar 40 is used as the collar member that pivotally supports the trailing arm 20 of the vehicle suspension mechanism in the vehicle body. It is possible to contribute to a reduction in weight of the torsion beam type suspension 100 by lightening the bush 90 since the resin bush 90 may be used as the bush 90 press-fitted into the rolled collar 40.

The apparatus 200 for manufacturing the rolled collar 40 of the present embodiment manufactures the rolled collar 40 using the progressive press-working apparatus that includes the plurality of pressing units for successively forming the long steel processed material 201 by sending the processed material 201 in order, and includes the trim unit 210, the coining unit 220, and the cutting unit 280. It is possible to efficiently manufacture the rolled collar 40 including the notch part 70 and the cavity part 80 through progressive formation.

The apparatus 200 for manufacturing the rolled collar 40 further includes the bending unit 230 and the separation unit 290. The rolled collar 40 may be more efficiently manufactured through progressive formation by including a bending process and separation of the main body part 50 from the processed material 201.

The coining unit 220 forms the coining recess 221 in a part continued from the connecting part 202. Thus, when a part corresponding to the notch part 70 is cut in the cutting unit 280, the connecting part 202 is cut away from the main body part 50. Therefore, the cutting unit 280 may be allowed to function as the separation unit 290, and thus pressing units that need to be included in the progressive press-working apparatus may be reduced. Accordingly, it is possible to simplify a configuration of the apparatus 200 for manufacturing the rolled collar 40.

A method of manufacturing the rolled collar 40 of the present embodiment is a method of manufacturing the rolled collar 40 using a progressive press-working method including a plurality of pressing processes in which the long steel processed material 201 is successively formed by being sent in order, and may efficiently manufacture the rolled collar 40 using progressive formation through trimming, formation of the coining recess 221, and formation of the notch part 70 and the cavity part 80.

The method of manufacturing the rolled collar 40 may more efficiently manufacture the rolled collar 40 through progressive formation by including bending and forming of the processed material 201, and separation of the main body part 50 from the processed material 201.

Since the coining recess 221 is formed in a part continued from the connecting part 202, the connecting part 202 is cut away from the main body part 50 when a part corresponding to the notch part 70 is cut. Therefore, it is possible to cut the part corresponding to the notch part 70 and separate the main body part 50 from the processed material 201 at the same time. Thus, pressing processes that need to be included in the progressive press-working method may be reduced, and. procedures for manufacturing the rolled collar 40 may be simplified.

The invention is not restricted to the above-described embodiment, and may be appropriately modified. For example, various shapes and dimensions may be employed as shapes and dimensions of the notch part 70 and the cavity part 80, and the shapes and dimensions are not restricted to the shapes and dimensions in the embodiment.

In addition, various shapes may be employed as shapes of the first and second clinch parts 61 and 62, and the shapes are not restricted to the illustrated shapes.

Further, a description has been given of the apparatus 200 and method of manufacturing the rolled collar 40 which forms the notch part 70 after forming the coining recess 221. However, the invention is not restricted thereto. For example, the notch part 70 and the cavity part 80 may be simultaneously formed, by performing cutting while performing coining. Alternatively, the notch part 70 may be formed in advance, and then the cavity part 80 may be formed through coining.

A description has been given of the embodiment in which the rolled collar 40 is used as the collar member that pivotally supports the trailing arm 20 in the vehicle body. However, the invention is not restricted thereto. The rolled collar 40 may be widely used as the steel rolled collar 40 into which the resin bush 90 is press-fitted.

REFERENCE SIGNS LIST

10: Torsion beam
20: Trailing arm (joining member and arm member)
30: Roll bar
40: Rolled collar
41; Plate material
50; Main body part
51: First butting end surface (end surface)
52: Second butting end surface (end surface)
53: Annular edge
54: Guide surface
60: Clinch part
61: First clinch part
62: Second clinch part
70: Notch part
71: Edge portion of notch part on inner circumferential surface side
80: Cavity part
81: Clearance
82: Crushing part
83: Chamfer part
90: Resin bush
100: Torsion beam type suspension
200: Apparatus for manufacturing rolled collar
201: Processed material
202: Connecting part
210: Trim unit
220: Coining unit
221: Coining recess
230: Bending unit
0280: Cutting unit
290: Separation unit
310: Convex jig
D: Depth from inner circumferential surface to crushing part
W: Width of crushing part from notch part

The invention claimed is:

1. A rolled collar made of steel into which a resin bush is press-fitted, the rolled collar being fit to a joining member by welding, the rolled collar comprising:
a main body part formed in a hollow cylindrical shape from a bent and formed steel plate material having a rectangular shape, and butting both end surfaces with each other;
a clinch part provided on each of the both end surfaces in the main body part which joins the both end surfaces by fitting;
a notch part formed from a cut off portion of an annular edge in the main body part, the notch part into which a convex jig determining a position of the main body part at a time of welding is fit; and
a cavity part which is hollow from an inner circumferential surface side on a wall surface around the notch part to form a clearance between the press-fitted resin bush and an edge portion of the notch part on the inner circumferential surface side.

2. A rolled collar manufacturing apparatus for manufacturing the rolled collar according to claim 1 comprising a progressive press-working apparatus including a plurality of pressing units for successively forming a long steel processed material by sending the processed material in order, the apparatus comprising:

a trim unit for trimming the processed material in contour shapes of the main body part and the clinch part while leaving a connecting part for sending the processed material in order;

a coining unit for forming a coining recess by coining a portion of the processed material in a flat plate state before bending and forming the trimmed processed material; and a cutting unit for forming the notch part and the cavity part by cutting off a portion of the coining recess.

3. The rolled collar manufacturing apparatus according to claim 2, further comprising:

a bending unit for forming the main body part by bending and forming the processed material on which the coining recess is formed, and joining both end surfaces of the processed material to each other through fitting of the clinch part; and a separation unit for forming the notch part and the cavity part in the bent and formed main body part, and then separating the main body part from the processed material.

4. The rolled collar manufacturing apparatus according to claim 2, wherein the coining unit fauns the coining recess in a part continued from the connecting part.

5. A rolled collar manufacturing method of manufacturing the rolled collar according to claim 1 comprising a progressive press-working method including a plurality of pressing processes in which a long steel processed material is successively formed by being sent in order, the method comprising:

trimming the processed material in contour shapes of the main body part and the clinch part while leaving a connecting part for sending the processed material in order;

forming a coining recess by coining a portion of the processed material in a flat plate state before bending and forming the trimmed processed material; and forming the notch part and the cavity part by cutting off a portion of the coining recess.

6. The rolled collar manufacturing method according to claim 5, further comprising:

forming the main body part by bending and forming the processed material on which the coining recess is formed, and joining both end surfaces of the processed material to each other through fitting of the clinch part; and obtaining the rolled collar by forming the notch part and the cavity part in the bent and formed main body part, and then separating the main body part from the processed material.

7. The rolled collar manufacturing method according to claim 5, wherein the coining recess is formed in a part continued from the connecting part.

8. The rolled collar according to claim 1, wherein the cavity part is formed from a pressed portion of the plate material, and has a crushing part which is continues from the notch part and has a smaller thickness than a plate thickness of the plate material, and a chamfer part which continues from the crushing part and increases in thickness up to the plate thickness of the plate material.

9. The rolled collar according to claim 8, wherein a depth D from the inner circumferential surface to the crushing part is 20%±0.1 mm of the plate thickness of the plate material, and a width W of the crushing part from the notch part is in a range of 1.0 to 2.0 mm.

10. The rolled collar according to claim 1, wherein the notch part is formed at a position for including the butted both end surfaces in a welding place when the convex jig is fit into the notch part.

11. The rolled collar according to claim 1, wherein the notch part is provided at each of two annular edges in the main body part.

12. The rolled collar according to claim 1, wherein the annular edge includes a guide surface that guides the press-fitted bush.

13. The rolled collar according to claim 1, wherein the rolled collar is a collar member that pivotally supports an arm member of a vehicle suspension mechanism in a vehicle body.

* * * * *